United States Patent
Gates

[19]

[11] Patent Number: 5,988,149
[45] Date of Patent: Nov. 23, 1999

[54] PRESSURE SENSING SYSTEM FOR AN INTERNAL COMBUSTION ENGINE

[75] Inventor: Freeman Carter Gates, Bloomfield Hills, Mich.

[73] Assignee: Ford Global Technologies, Inc., Dearborn, Mich.

[21] Appl. No.: 09/120,748

[22] Filed: Jul. 23, 1998

[51] Int. Cl.⁶ .......................... F02M 25/07; F02M 37/04
[52] U.S. Cl. .............................. 123/568.21; 123/568.27; 123/497
[58] Field of Search ..................... 123/458, 497, 123/568.11, 568.16, 568.17, 568.18, 568.21, 568.23, 568.24, 568.25, 568.26, 568.27, 568.28; 73/31.04, 723

[56] References Cited

U.S. PATENT DOCUMENTS

| | | | |
|---|---|---|---|
| 4,257,381 | 3/1981 | Yuzawa et al. | 477/111 |
| 4,274,385 | 6/1981 | Yuzawa et al. | 123/568.27 |
| 4,290,404 | 9/1981 | Hata et al. | 123/478 |
| 4,318,385 | 3/1982 | Yamaguchi | 123/676 |
| 4,390,001 | 6/1983 | Fujimoto | 123/568.2 |
| 4,428,354 | 1/1984 | Sundeen et al. | 123/568.28 |
| 5,133,323 | 7/1992 | Treusch | 123/494 |
| 5,190,017 | 3/1993 | Cullen et al. | 123/568.16 |
| 5,241,940 | 9/1993 | Gates, Jr. | 123/568.27 |
| 5,355,859 | 10/1994 | Weber | 123/497 |
| 5,443,046 | 8/1995 | White | 123/438 |
| 5,515,833 | 5/1996 | Cullen et al. | 123/568.27 |
| 5,542,395 | 8/1996 | Tuckey et al. | 123/497 |
| 5,546,911 | 8/1996 | Iwamoto et al. | 123/497 |
| 5,577,484 | 11/1996 | Izutani et al. | 123/568.16 |
| 5,579,738 | 12/1996 | Frischmuth et al. | 123/497 |
| 5,586,539 | 12/1996 | Yonekawa et al. | 123/497 |
| 5,590,631 | 1/1997 | Tuckey | 123/447 |
| 5,613,479 | 3/1997 | Gates et al. | 123/568.27 |
| 5,819,709 | 10/1998 | Holmes et al. | 123/497 |
| 5,848,583 | 12/1998 | Smith et al. | 123/497 |

*Primary Examiner*—Willis R. Wolfe
*Attorney, Agent, or Firm*—Jerome R. Drouillard

[57] ABSTRACT

An internal combustion engine including a pressure sensing system. A first (80) and a second (82) absolute pressure sensor are located in a main sensor housing (60) mounted near an intake manifold (20). The first pressure sensor (80) measures the pressure in an EGR passage (68) between an EGR valve (30) and an orifice (76), and the second pressure sensor 82 measures the pressure in the intake manifold (20) downstream of the throttle valve (46). A fuel sensor housing (54) is mounted to the fuel rail (50) and includes a third absolute pressure sensor (84) that measures the pressure in the fuel rail (50). The signals from three sensors are then used by a powertrain control module (42) to control the exhaust gas recirculation and returnless fuel systems.

9 Claims, 3 Drawing Sheets

PRESSURE SENSING SYSTEM FOR AN INTERNAL COMBUSTION ENGINE

FIELD OF THE INVENTION

The present invention relates to a sensing assembly for use with an internal combustion engine, and more particularly to sensing systems related to the flow of intake air, EGR gasses and fuel into an internal combustion engine.

BACKGROUND OF THE INVENTION

A typical internal combustion engine used in a vehicle includes some type of sensing assembly for measuring manifold absolute pressure (MAP) in order to determine the amount of pressure in an intake manifold, which is used by an engine computer to control some of the parameters of engine operation.

Also, in today's vehicles, during certain engine operating conditions, their is a desire to recirculate a portion of the exhaust gasses from the engine back into the intake manifold to mix with the incoming air. The amount of exhaust gas recirculation (EGR) is determined by an EGR valve, which is controlled by the engine computer. In order for the engine computer to determine if any change in flow of EGR gasses is needed it must have an input as to the current flow of EGR gasses. This is typically accomplished by locating an orifice in an EGR tube just downstream of the location where the EGR tube separates from the main exhaust stream, with taps into the EGR tube on either side of the orifice. The two taps are then connected to hoses leading to a relative pressure sensor that compares the upstream and downstream pressures to obtain the pressure difference. This value is then fed to the engine computer, and when combined with the MAP allows the engine computer to compute a delta pressure feedback exhaust (DPFE) signal, which is, in turn, used to determine the amount of EGR flow.

Several drawbacks to this technique of EGR sensing exist. One drawback is that there are two sets of taps and hoses needed to obtain the pressure value, in addition to an entirely separate sensor assembly for reading the MAP pressure. Further, with the location of the orifice, and corresponding taps and hoses, being close to the main exhaust stream, the sensor assembly is exposed to a great deal of heat from the exhaust gasses, and so relatively expensive materials must be employed to withstand this heat and operate adequately during the life of the vehicle. Also, the sensor assembly can be affected by the pressure pulses in the exhaust stream.

An additional sensing system that is coming into wide use in vehicles today is an electronic returnless fuel system. In order to operate this system effectively, a sensor assembly must be employed at some point in the fuel system to monitor the fuel pressure. Typically, this fuel pressure sensor system involves a differential pressure sensor employed with taps and hoses extending from both the fuel rail and the intake manifold in order to obtain a value as to the difference in pressure between the two. With this arrangement, hot fuel is contained within one of the pressure hoses, which is generally not desirable, and further, a rather more complex differential pressure sensor is employed to obtain the needed pressure measurement.

Thus, there are several separate sensing assemblies in vehicles, all directed toward controlling some portion of the total intake of gasses and fuel into the engine, each of which adds to the cost and complexity of the overall engine assembly. Consequently, a desire exists to have an inexpensive and reliable sensing system for accurately monitoring the intake of gasses and fuel into the internal combustion engine.

SUMMARY OF THE INVENTION

In its embodiments, the present invention contemplates a sensor system for use in an internal combustion engine including an intake passage provided therein with a throttle valve, an exhaust passage, an exhaust gas recirculation passage connecting the exhaust passage to a first portion of the intake passage provided downstream of the throttle valve and containing an exhaust gas recirculation valve, and a fuel rail having at least one fuel injector mounted thereon. The sensor system includes an EGR orifice located between the exhaust gas recirculation valve and the intake passage, and a sensor housing located adjacent the intake passage and including a first and a second absolute pressure sensor. An EGR pressure passage extends from a location between the EGR valve and the EGR orifice to the first absolute pressure sensor in the sensor housing. Also, a MAP pressure passage extends from a location in the intake passage downstream of the throttle valve to the second absolute pressure sensor in the sensor housing. A fuel rail pressure housing is located adjacent the fuel rail including a third absolute pressure sensor, and a fuel pressure passage extends between the fuel rail and the third absolute pressure sensor. The sensor system also includes means for receiving signals from the first, second and third absolute pressure sensors, calculating the difference between the signals from the first and second pressure sensors to generate a DPFE output signal, and calculating the difference between the signals from the third and second pressure sensor to generate a fuel injector pressure signal.

Accordingly, an object of the present invention is to provide a sensing system that will measure EGR and fuel rail pressures, in combination with a single MAP sensor, while minimizing the cost and complexity of the sensing system.

An advantage of the present invention is that having a sensor housing for a fuel pressure sensor mounted on the fuel rail itself avoids having to transport hot fuel through a hose in order to sense the pressure.

A further advantage of the present invention is that it only employs three absolute pressure sensors, with each needing only one input, that will produce sensor signals for control of EGR and a returnless fuel system as well as providing a pressure value for the intake manifold.

Another advantage of the present invention is that none of the hoses, taps or sensors is exposed to high temperatures of the exhaust gasses near the main exhaust stream coming out of the internal combustion engine.

DETAILED DESCRIPTION OF THE PREFERRED EMBODIMENTS

Figure 1:
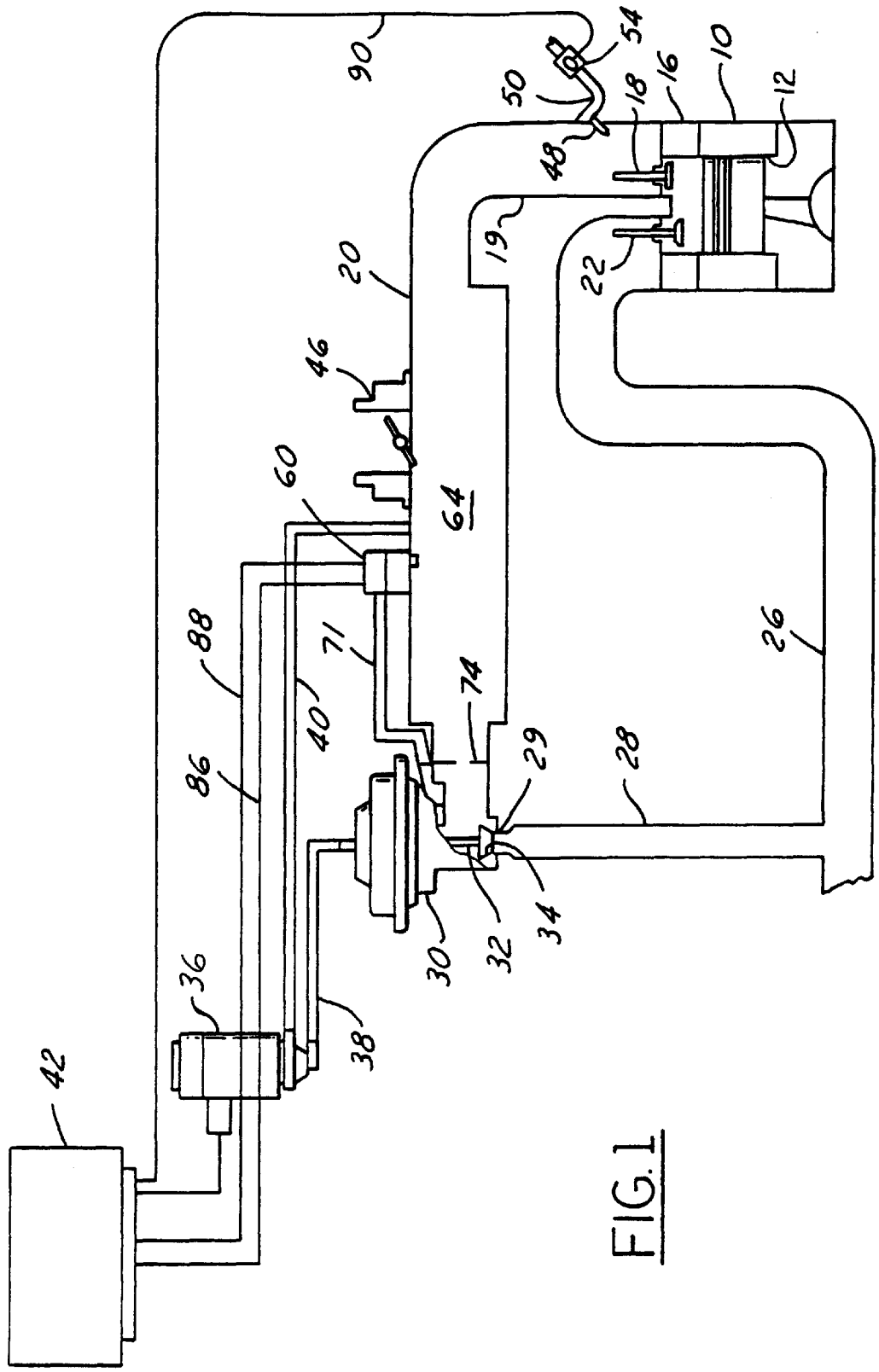
FIG. 1 is a schematic representation of an engine assembly, including portions of the intake and exhaust system and the sensor assembly, in accordance with the present invention.
Figure 2:
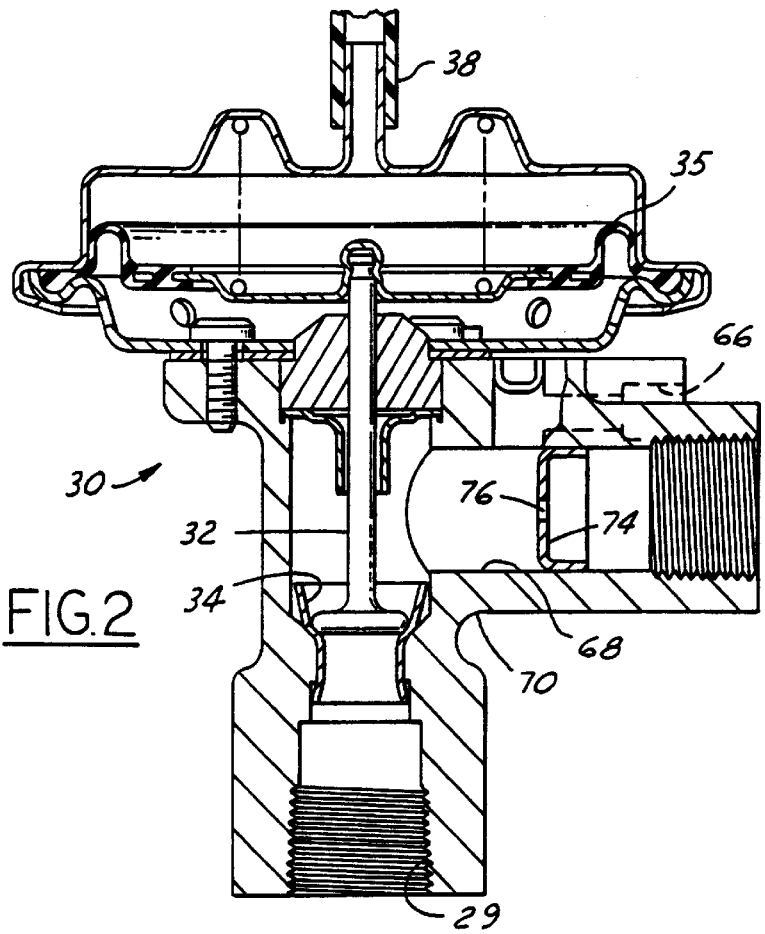
FIG. 2 is an enlarged view of an EGR valve assembly in accordance with the present invention.
Figure 3:
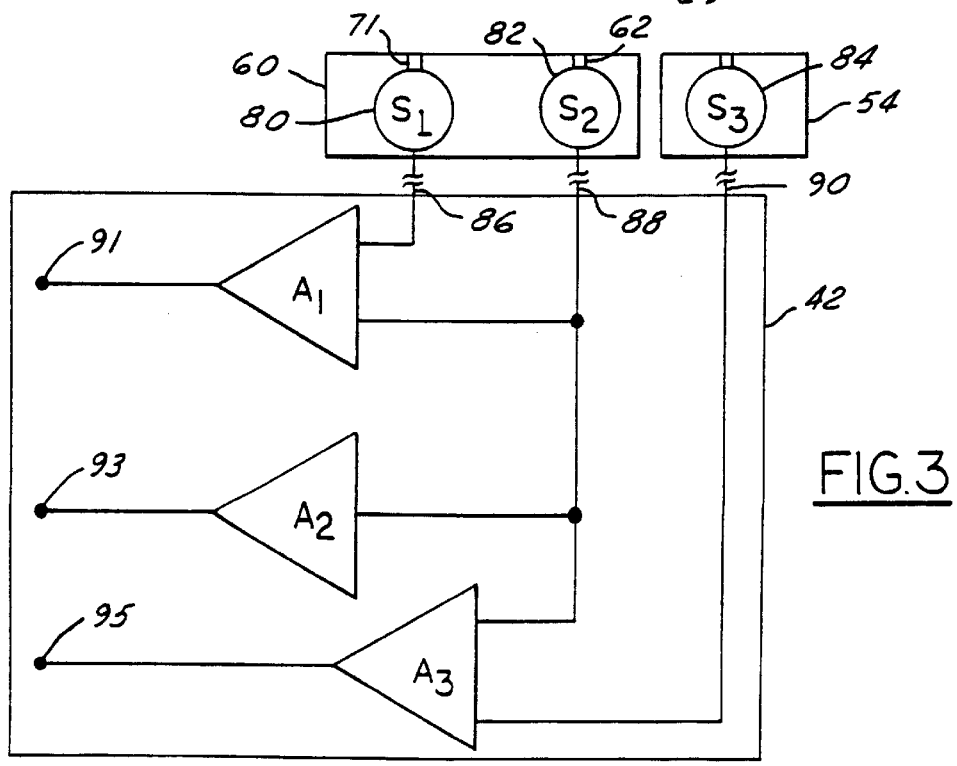
FIG. 3 is a schematic diagram of the sensor assembly and signal processing in accordance with the present invention.
Figure 4:
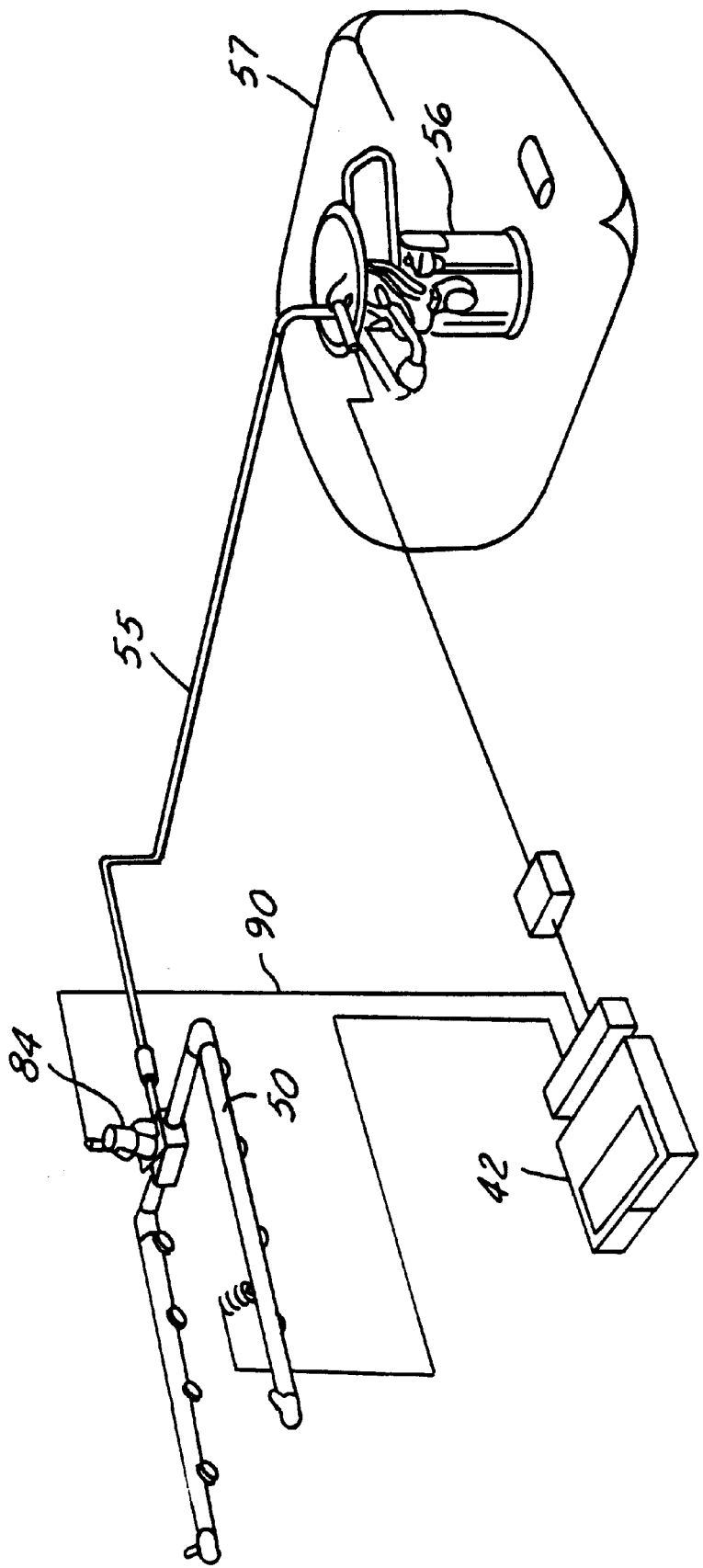
FIG. 4 is a schematic, perspective view of a portion of a fuel system and fuel sensor in accordance with the present invention.

FIGS. 1–4 illustrate a portion of an engine assembly and sensor system. The engine assembly includes a cylinder block 10 having cylinders 12 formed therein, and pistons 14 mounted within the cylinders 12 for operation in a conventional fashion. A cylinder head 16 mounts on the cylinder block 10 and includes intake valves 18 for selectively receiving a fuel air mixture from air intake passages 19, leading from an intake manifold 20, and exhaust valves 22 for selectively discharging gasses into an exhaust manifold 24. The exhaust manifold 24 leads to an exhaust pipe 26 that eventually leads out to the atmosphere, as in conventional engine configurations.

An EGR tube 28 taps into the exhaust pipe 26, in order to allow for some of the exhaust gas to be selectively diverted into the intake manifold 20. The EGR tube 28 extends to an inlet 29 in an EGR valve 30. The EGR valve 30 controls the flow of the EGR gasses via a pintle 32 being moved up and down relative to an orifice 34 by a vacuum controlled valve mechanism 35. The vacuum in the valve 30 is varied by an EGR vacuum regulator 36, connected to the EGR valve 30 via tubing 38. The EGR regulator 36 also includes a reference tube 40 that taps into the intake manifold 20. The EGR regulator 36 is, in turn, electronically controlled in a conventional fashion by a powertrain control module (PCM) 42. While the EGR valve illustrated in this application is driven by a vacuum source, it can instead be driven electronically by a motor, for example a stepper motor, as is known to those skilled in the art.

The EGR valve 30 is mounted to the intake manifold 20. The intake manifold 20 also has a throttle body 46 mounted thereto at an air intake opening for controlling the flow of intake air in a conventional fashion. Downstream thereof, mounted along the air intake passage 19, are fuel injectors 48. Each of the fuel injectors 48 is connected to a fuel rail 50, in a conventional fashion. There is a fuel sensor housing 54, which is mounted on top of the fuel rail 50 and taps into the fuel rail 50. Contained within the fuel sensor housing 54 is a fuel sensor 84, which is an absolute sensor. The sensor 84 can be silicon capacitive, piezoresistive, ceramic capacitive, etc. as desired. The fuel sensor 84 includes an electrical connection 90 to the PCM 42.

For the fuel system, fuel flows through a conduit 55 leading from a fuel pump 56, that is typically located in the vehicle fuel tank 57. The fuel pump 56 is electrically connected to and controlled by the PCM 42. The fuel sensor 84 will be used by the PCM 42 to control the pump 56.

A main sensor housing 60 is mounted to the intake manifold 20 and includes two absolute sensors, an EGR sensor 80 and a MAP sensor 82. Again, the sensors can be silicon capacitive, piezoresistive, ceramic capacitive, etc. as desired. The EGR sensor 80 and MAP sensor 82 include electrical connections 86 and 88, respectively to the PCM 42. A MAP passage 62 leads from the intake manifold plenum 64 to the MAP sensor 82 in the housing 60. Also, an EGR pressure passage 66 extends from an EGR outlet passage 68 leading from the pintle valve 32, through the housing 70 of the EGR valve 30. An EGR pressure hose 71 extends from the EGR pressure passage 66 to the EGR sensor 80 in the main sensor housing 60.

An insert 74 is located within the outlet passage 68, downstream of the intersection of the outlet passage 68 and the EGR pressure passage 66. The insert 74 includes an orifice 76 therethrough, allowing for the flow of EGR gasses while creating a measurable pressure difference between the upstream side of the insert 74 and the downstream side of the insert 74. In this way, the EGR pressure passage 66 is exposed to the pressure around the EGR valve, while downstream of the insert 74, the pressure is the MAP. This MAP is read via the MAP pressure passage 62, thus not requiring a separate sensor and sensor passage just downstream of the insert 74 in order to obtain the pressure difference across the insert 74.

When operating the engine, the first sensor 80 produces a signal $S_1$ corresponding to the pressure in the EGR pressure passage 66, the second sensor 82 produces a signal $S_2$ corresponding to the MAP pressure in the MAP pressure passage 62, and the third sensor 84 produces a signal $S_3$ corresponding to the fuel pressure in the fuel rail 50. The signals $S_1$, $S_2$ and $S_3$ are then received by the powertrain control module 42 through the respective electrical connections 86, 88 and 90.

The powertrain control module then processes the three absolute pressure signals in order to obtain the desired output signals, which are then used in other areas of the module to control various engine operating parameters. This processing can be accomplished by an electronic circuit or by employing software; and this can be done with a separate control module if so desired rather than within the powertrain control module 42.

A DPFE output signal 91 is created by feeding signals $S_1$ and $S_2$ through a difference amplifier $A_1$ to calculate a value $K_1*(S_1-S_2)$, where $K_1$ is a gain factor and the difference between $S_1$ and $S_2$ is the difference in pressure between the sensed EGR pressure and the MAP. The DPFE output signal 91 is then used in a conventional fashion to determine the valve position needed for the EGR valve 30 in order to obtain the desired flow of EGR gasses.

An injector pressure output signal 95 is created by feeding signals $S_2$ and $S_3$ through a difference amplifier $A_3$ to calculate a value $K_3*(S_3-S_2)$, where $K_3$ is a gain factor and the difference between $S_3$ and $S_2$ is the pressure difference between the injector fuel pressure and the MAP. The injector output signal 95 is then used to control the fuel pump 56 for the returnless fuel system. With this sensor assembly, the one MAP sensor 82 provides the needed information for both EGR control and fuel control.

Since the second sensor 82 is an absolute pressure sensor that measures the MAP directly, amplifier $A_2$ merely multiplies the MAP signal $S_2$ by a gain factor $K_2$ to produce a MAP output signal 93.

While certain embodiments of the present invention have been described in detail, those familiar with the art to which this invention relates will recognize various alternative designs and embodiments for practicing the invention as defined by the following claims.

I claim:

1. An engine supply control system for use in an internal combustion engine including an intake passage provided therein with a throttle valve, an exhaust passage, and an EGR passage connecting the exhaust passage to the intake passage downstream of the throttle valve, with the EGR passage including an EGR valve, and with a fuel rail and at least one fuel injector communicating with the fuel rail, the engine supply control system comprising:

a control orifice within the EGR passage, located downstream of the EGR valve;

a first absolute pressure sensor operatively engaging the EGR passage upstream of the control orifice and downstream of the EGR valve for detecting an EGR pressure and creating a corresponding EGR pressure signal;

a second absolute pressure sensor operatively engaging the intake passage downstream of the control orifice and the throttle valve for detecting a manifold absolute pressure and creating a corresponding MAP signal;

a third absolute pressure sensor operatively engaging the fuel rail for detecting a fuel pressure and creating a corresponding fuel pressure signal;

means for combining the EGR pressure signal and the MAP signal to produce a DPFE signal; and means for combining the fuel pressure signal and the MAP signal to produce a fuel control signal.

2. A sensor system for use in an internal combustion engine including an intake passage provided therein with a throttle valve, an exhaust passage, an exhaust gas recirculation passage connecting the exhaust passage to a first portion of the intake passage provided downstream of the throttle valve and containing an exhaust gas recirculation valve, and a fuel rail having at least one fuel injector mounted thereon, the sensor system comprising:

an EGR orifice located between the exhaust gas recirculation valve and the intake passage;

a sensor housing located adjacent the intake passage and including a first and a second absolute pressure sensor;

an EGR pressure passage extending from a location between the EGR valve and the EGR orifice to the first absolute pressure sensor in the sensor housing;

a MAP pressure passage extending from a location in the intake passage downstream of the throttle valve to the second absolute pressure sensor in the sensor housing;

a fuel rail pressure housing located adjacent the fuel rail including a third absolute pressure sensor;

a fuel pressure passage extending between the fuel rail and the third absolute pressure sensor;

means for receiving signals from the first, second and third absolute pressure sensors, calculating the difference between the signals from the first and second pressure sensors to generate a DPFE output signal, and calculating the difference between the signals from the third and second pressure sensor to generate a fuel injector pressure signal;

means adapted for selectively controlling the output of a fuel pump based upon the fuel injector pressure signal; and means adapted for selectively controlling the exhaust gas recirculation valve opening based upon the DPFE output signal.

3. The sensor system of claim 2 wherein the fuel rail pressure housing is mounted on the fuel rail.

4. A sensor system for use in an internal combustion engine including an intake passage provided therein with a throttle valve, an exhaust passage, an exhaust gas recirculation passage connecting the exhaust passage to a first portion of the intake passage provided downstream of the throttle valve and containing an exhaust gas recirculation valve, and a fuel rail having at least one fuel injector mounted thereon, the sensor system comprising:

an EGR orifice located between the exhaust gas recirculation valve and the intake passage;

a sensor housing located adjacent the intake passage and including a first and a second absolute pressure sensor;

an EGR pressure passage extending from a location between the EGR valve and the EGR orifice to the first absolute pressure sensor in the sensor housing;

a MAP pressure passage extending from a location in the intake passage downstream of the throttle valve to the second absolute pressure sensor in the sensor housing;

a fuel rail pressure housing located adjacent the fuel rail including a third absolute pressure sensor;

a fuel pressure passage extending between the fuel rail and the third absolute pressure sensor; and means for receiving signals from the first, second and third absolute pressure sensors, calculating the difference between the signals from the first and second pressure sensors to generate a DPFE output signal, and calculating the difference between the signals from the third and second pressure sensor to generate a fuel injector pressure signal.

5. The sensor system of claim 4 wherein the fuel rail pressure housing is mounted on the fuel rail.

6. The sensor system of claim 5 wherein the orifice is located within the exhaust gas recirculation valve.

7. The sensor system of claim 6 further including means adapted for selectively controlling the output of a fuel pump based upon the fuel injector pressure signal.

8. The sensor system of claim 7 further including means adapted for selectively controlling the exhaust gas recirculation valve opening based upon the DPFE output signal.

9. The sensor system of claim 4 wherein the orifice is located within the exhaust gas recirculation valve.

* * * * *